US012566482B2

(12) United States Patent
Shamsi et al.

(10) Patent No.: US 12,566,482 B2
(45) Date of Patent: Mar. 3, 2026

(54) PROVIDING POWER DELIVERY DATA WHILE AN INFORMATION HANDLING SYSTEM IS POWERED OFF OR IN A LOW POWER STATE

(71) Applicant: DELL PRODUCTS L.P., Round Rock, TX (US)

(72) Inventors: Osaid Shamsi, Spring, TX (US); Marcin Nowak, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 102 days.

(21) Appl. No.: 18/532,501

(22) Filed: Dec. 7, 2023

(65) Prior Publication Data
US 2025/0190037 A1    Jun. 12, 2025

(51) Int. Cl.
| | |
|---|---|
| *G06F 1/26* | (2006.01) |
| *G06F 1/16* | (2006.01) |
| *G06F 1/3212* | (2019.01) |
| *G06F 1/3287* | (2019.01) |
| *G06F 9/4401* | (2018.01) |
| *G06F 11/32* | (2006.01) |

(52) U.S. Cl.
CPC .............. *G06F 1/26* (2013.01); *G06F 11/328* (2013.01); *G06F 1/1616* (2013.01); *G06F 1/266* (2013.01); *G06F 1/3212* (2013.01); *G06F 1/3287* (2013.01); *G06F 9/4418* (2013.01)

(58) Field of Classification Search
CPC .......... G06F 1/26; G06F 1/3287; G06F 1/266; G06F 9/4418; G06F 1/3212; G06F 1/1616; G06F 11/328
USPC .................. 713/300, 323, 324, 340; 715/772
See application file for complete search history.

(56) References Cited

U.S. PATENT DOCUMENTS

| | | | | |
|---|---|---|---|---|
| 5,335,192 A | * | 8/1994 | Oshiba .................. | G06F 1/1616 361/679.09 |
| 9,153,106 B1 | * | 10/2015 | Kuscher ............. | G01R 31/3646 |
| 10,854,170 B2 | | 12/2020 | Khen et al. | |
| 11,150,698 B2 | | 10/2021 | Wood, III et al. | |
| 2006/0248363 A1 | * | 11/2006 | Chen ..................... | G06F 1/1616 713/300 |
| 2009/0167691 A1 | * | 7/2009 | Wang .................... | G06F 1/1679 345/168 |
| 2010/0218021 A1 | * | 8/2010 | Ma ........................ | G06F 1/1684 713/340 |
| 2010/0295384 A1 | * | 11/2010 | Kobayashi ............ | G06F 13/385 307/154 |
| 2011/0043227 A1 | * | 2/2011 | Pance .................. | H03K 17/962 324/681 |
| 2018/0307290 A1 | | 10/2018 | Montero et al. | |
| 2020/0384885 A1 | * | 12/2020 | Namiki ................. | B60K 35/00 |

* cited by examiner

*Primary Examiner* — Ji H Bae
(74) *Attorney, Agent, or Firm* — Larson Newman, LLP

(57) ABSTRACT
A system requests power delivery data from an information handling system docked to a docking station, and receives a response that includes the power delivery data. If the information handling system is not in a working power state, then the system generates an image associated with the power delivery data.

20 Claims, 3 Drawing Sheets

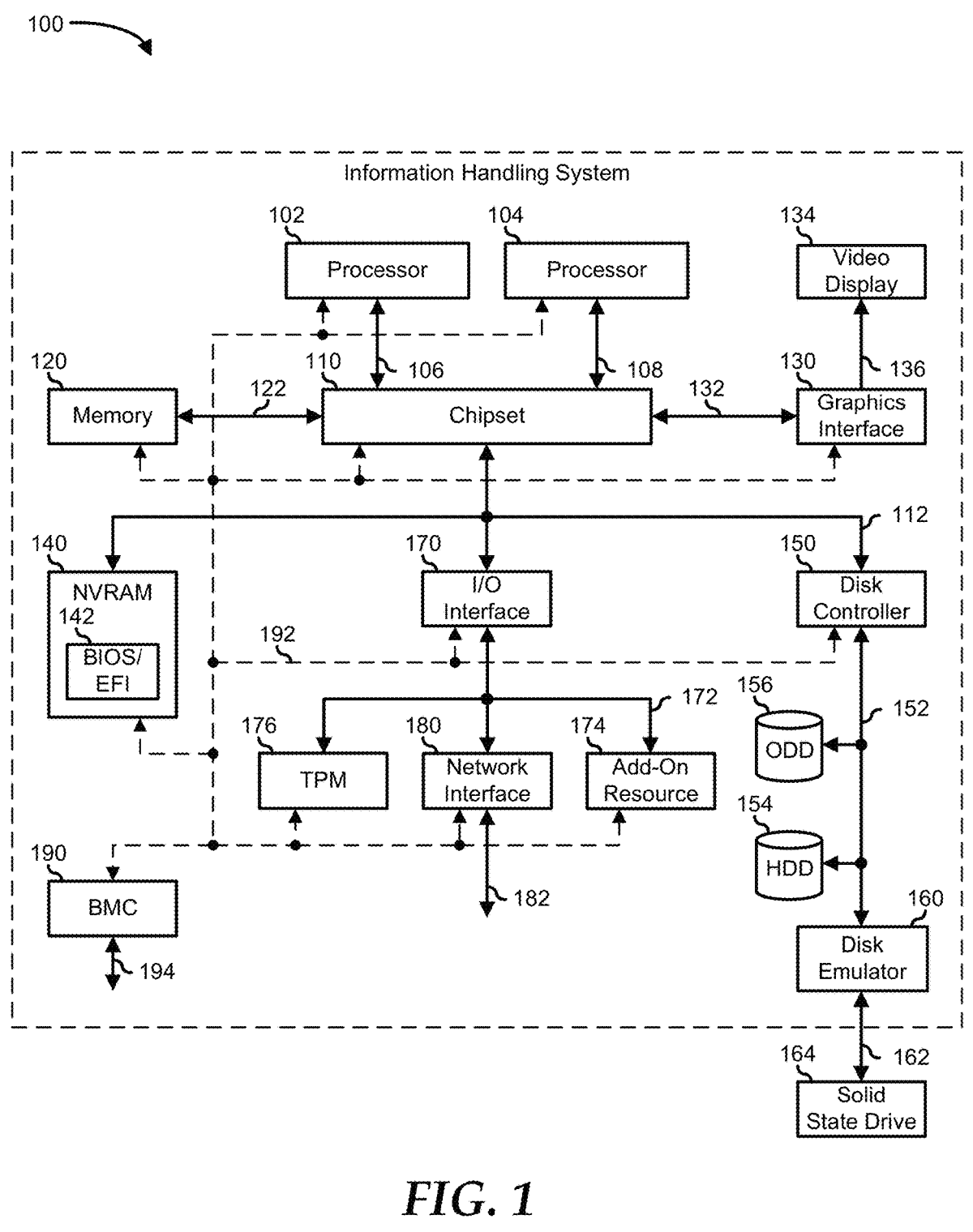

100

Information Handling System

102
Processor

104
Processor

134
Video Display

120
Memory 110
106
Chipset
108

132

130
136
Graphics Interface

122

112

140
NVRAM
142
BIOS/ EFI

170
I/O Interface

150
Disk Controller

192

176
TPM

180
Network Interface

174
Add-On Resource
172

156
ODD

152

154
HDD

160
Disk Emulator

190
BMC

194

182

164
162
Solid State Drive

*FIG. 1*

PROVIDING POWER DELIVERY DATA WHILE AN INFORMATION HANDLING SYSTEM IS POWERED OFF OR IN A LOW POWER STATE

FIELD OF THE DISCLOSURE

The present disclosure generally relates to information handling systems, and more particularly relates to providing power delivery data while an information handling system is powered off or in a low power state.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

A system requests power delivery data from an information handling system docked to a docking station, and receives a response that includes the power delivery data. If the information handling system is not in a working power state, then the system generates an image associated with the power delivery data.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which:

FIG. 1 is a block diagram illustrating an information handling system according to an embodiment of the present disclosure;

The use of the same reference symbols in different drawings indicates similar or identical items.

DETAILED DESCRIPTION OF THE DRAWINGS

Figure 2:
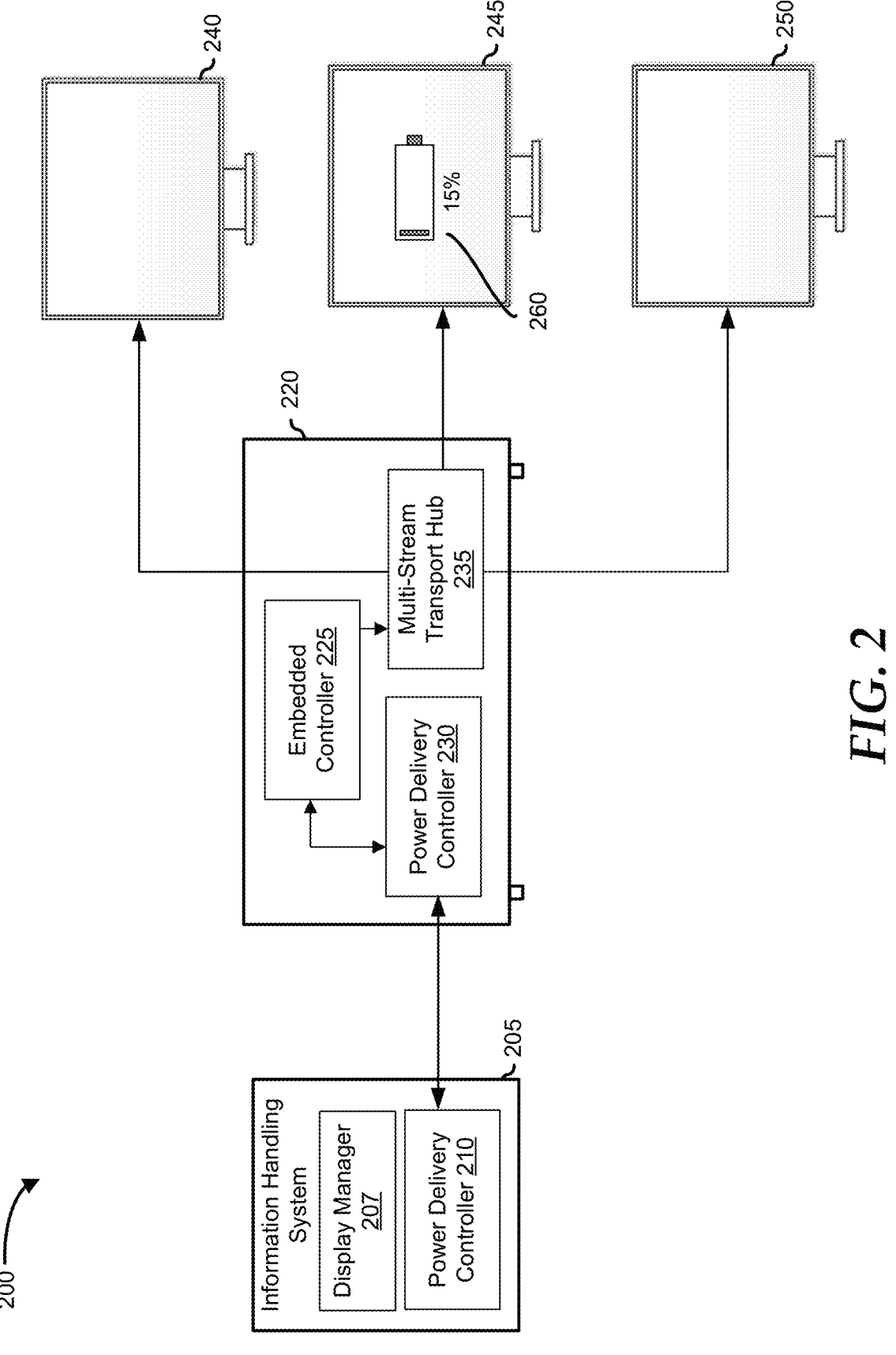
FIG. 2 is a block diagram of an environment for providing power delivery data while an information handling system is powered off or in a low power state, according to an embodiment of the present disclosure.

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

FIG. 1 illustrates an embodiment of an information handling system 100 including processors 102 and 104, a chipset 110, a memory 120, a graphics adapter 130 connected to a video display 134, a non-volatile RAM (NV-RAM) 140 that includes a basic input and output system/extensible firmware interface (BIOS/EFI) module 142, a disk controller 150, a hard disk drive (HDD) 154, an optical disk drive 156, a disk emulator 160 connected to a solid-state drive (SSD) 164, an input/output (I/O) interface 170 connected to an add-on resource 174 and a trusted platform module (TPM) 176, a network interface 180, and a baseboard management controller (BMC) 190. Processor 102 is connected to chipset 110 via processor interface 106, and processor 104 is connected to the chipset via processor interface 108. In a particular embodiment, processors 102 and 104 are connected together via a high-capacity coherent fabric, such as a HyperTransport link, a QuickPath Interconnect, or the like. Chipset 110 represents an integrated circuit or group of integrated circuits that manage the data flow between processors 102 and 104 and the other elements of information handling system 100. In a particular embodiment, chipset 110 represents a pair of integrated circuits, such as a northbridge component and a southbridge component. In another embodiment, some or all of the functions and features of chipset 110 are integrated with one or more of processors 102 and 104.

Memory 120 is connected to chipset 110 via a memory interface 122. An example of memory interface 122 includes a Double Data Rate (DDR) memory channel and memory 120 represents one or more DDR Dual In-Line Memory Modules (DIMMs). In a particular embodiment, memory interface 122 represents two or more DDR channels. In another embodiment, one or more of processors 102 and 104 include a memory interface that provides a dedicated memory for the processors. A DDR channel and the connected DDR DIMMs can be in accordance with a particular DDR standard, such as a DDR3 standard, a DDR4 standard, a DDR5 standard, or the like.

Memory 120 may further represent various combinations of memory types, such as Dynamic Random Access Memory (DRAM) DIMMs, Static Random Access Memory (SRAM) DIMMs, non-volatile DIMMs (NV-DIMMs), storage class memory devices, Read-Only Memory (ROM) devices, or the like. Graphics adapter 130 is connected to chipset 110 via a graphics interface 132 and provides a video display output 136 to a video display 134. An example of a graphics interface 132 includes a Peripheral Component Interconnect-Express (PCIe) interface and graphics adapter 130 can include a four-lane (×4) PCIe adapter, an eight-lane (×8) PCIe adapter, a 16-lane (×16) PCIe adapter, or another configuration, as needed or desired. In a particular embodiment, graphics adapter 130 is provided down on a system printed circuit board (PCB). Video display output 136 can include a Digital Video Interface (DVI), a High-Definition Multimedia Interface (HDMI), a DisplayPort® interface, or the like, and video display 134 can include a monitor, a smart television, an embedded display such as a laptop computer display, or the like.

NV-RAM 140, disk controller 150, and I/O interface 170 are connected to chipset 110 via an I/O channel 112. An example of I/O channel 112 includes one or more point-to-point PCIe links between chipset 110 and each of NV-RAM 140, disk controller 150, and I/O interface 170. Chipset 110 can also include one or more other I/O interfaces, including a PCIe interface, an Industry Standard Architecture (ISA) interface, a Small Computer Serial Interface (SCSI) interface, an Inter-Integrated Circuit (I²C) interface, a System Packet Interface (SPI), a Universal Serial Bus (USB), another interface, or a combination thereof. NV-RAM 140 includes BIOS/EFI module 142 that stores machine-executable code (BIOS/EFI code) that operates to detect the resources of information handling system 100, to provide drivers for the resources, to initialize the resources, and to provide common access mechanisms for the resources. The functions and features of BIOS/EFI module 142 will be further described below.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits SSD 164 to be connected to information handling system 100 via an external interface 162. An example of external interface 162 includes a USB interface, an institute of electrical and electronics engineers (IEEE) 1394 (Firewire) interface, a proprietary interface, or a combination thereof. Alternatively, SSD 164 can be disposed within information handling system 100.

I/O interface 170 includes a peripheral interface 172 that connects the I/O interface to add-on resource 174, to TPM 176, and to network interface 180. Peripheral interface 172 can be the same type of interface as I/O channel 112 or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral interface 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board, or add-in card disposed within information handling system 100, a device that is external to the information handling system, or a combination thereof.

Network interface 180 represents a network communication device disposed within information handling system 100, on a main circuit board of the information handling system, integrated onto another component such as chipset 110, in another suitable location, or a combination thereof. Network interface 180 includes a network channel 182 that provides an interface to devices that are external to information handling system 100. In a particular embodiment, network channel 182 is of a different type than peripheral interface 172 and network interface 180 translates information from a format suitable to the peripheral channel to a format suitable to external devices.

In a particular embodiment, network interface 180 includes a NIC or host bus adapter (HBA), and an example of network channel 182 includes an InfiniBand channel, a Fibre Channel, a Gigabit Ethernet channel, a proprietary channel architecture, or a combination thereof. In another embodiment, network interface 180 includes a wireless communication interface, and network channel 182 includes a Wi-Fi channel, a near-field communication (NFC) channel, a Bluetooth® or Bluetooth-Low-Energy (BLE) channel, a cellular based interface such as a Global System for Mobile (GSM) interface, a Code-Division Multiple Access (CDMA) interface, a Universal Mobile Telecommunications System (UMTS) interface, a Long-Term Evolution (LTE) interface, or another cellular based interface, or a combination thereof. Network channel 182 can be connected to an external network resource (not illustrated). The network resource can include another information handling system, a data storage system, another network, a grid management system, another suitable resource, or a combination thereof.

BMC 190 is connected to multiple elements of information handling system 100 via one or more management interface 192 to provide out of band monitoring, maintenance, and control of the elements of the information handling system. As such, BMC 190 represents a processing device different from processor 102 and processor 104, which provides various management functions for information handling system 100. For example, BMC 190 may be responsible for power management, cooling management, and the like. The term BMC is often used in the context of server systems, while in a consumer-level device, a BMC may be referred to as an embedded controller (EC). A BMC included at a data storage system can be referred to as a storage enclosure processor. A BMC included at a chassis of a blade server can be referred to as a chassis management controller and embedded controllers included at the blades of the blade server can be referred to as blade management controllers. Capabilities and functions provided by BMC 190 can vary considerably based on the type of information handling system. BMC 190 can operate in accordance with an Intelligent Platform Management Interface (IPMI). Examples of BMC 190 include an Integrated Dell® Remote Access Controller (iDRAC).

Management interface 192 represents one or more out-of-band communication interfaces between BMC 190 and the elements of information handling system 100, and can include an Inter-Integrated Circuit (I²C) bus, a System Management Bus (SMBUS), a Power Management Bus (PMBUS), a Low Pin Count (LPC) interface, a serial bus such as a Universal Serial Bus (USB) or a Serial Peripheral Interface (SPI), a network interface such as an Ethernet interface, a high-speed serial data link such as a PCIe interface, a Network Controller Sideband Interface (NC-SI), or the like. As used herein, out-of-band access refers to operations performed apart from a BIOS/operating system execution environment on information handling system 100, that is apart from the execution of code by processors 102 and 104 and procedures that are implemented on the information handling system in response to the executed code.

BMC 190 operates to monitor and maintain system firmware, such as code stored in BIOS/EFI module 142, option ROMs for graphics adapter 130, disk controller 150, add-on resource 174, network interface 180, or other elements of information handling system 100, as needed or desired. In particular, BMC 190 includes a network interface 194 that can be connected to a remote management system to receive firmware updates, as needed or desired. Here, BMC 190 receives the firmware updates, stores the updates to a data storage device associated with the BMC, transfers the firmware updates to NV-RAM of the device or system that is the subject of the firmware update, thereby replacing the currently operating firmware associated with the device or system, and reboots information handling system, whereupon the device or system utilizes the updated firmware image.

BMC 190 utilizes various protocols and application programming interfaces (APIs) to direct and control the processes for monitoring and maintaining the system firmware. An example of a protocol or API for monitoring and maintaining the system firmware includes a graphical user interface (GUI) associated with BMC 190, an interface defined by the Distributed Management Taskforce (DMTF) (such as a Web Services Management (WSMan) interface, a Management Component Transport Protocol (MCTP) or, a Redfish® interface), various vendor defined interfaces (such as a Dell EMC Remote Access Controller Administrator (RACADM) utility, a Dell EMC OpenManage Enterprise, a Dell EMC OpenManage Server Administrator (OMSS) utility, a Dell EMC OpenManage Storage Services (OMSS) utility, or a Dell EMC OpenManage Deployment Toolkit (DTK) suite), a BIOS setup utility such as invoked by a "F2" boot option, or another protocol or API, as needed or desired.

In a particular embodiment, BMC 190 is included on a main circuit board (such as a baseboard, a motherboard, or any combination thereof) of information handling system 100 or is integrated onto another element of the information handling system such as chipset 110, or another suitable element, as needed or desired. As such, BMC 190 can be part of an integrated circuit or a chipset within information handling system 100. An example of BMC 190 includes an iDRAC, or the like. BMC 190 may operate on a separate power plane from other resources in information handling system 100. Thus BMC 190 can communicate with the management system via network interface 194 while the resources of information handling system 100 are powered off. Here, information can be sent from the management system to BMC 190 and the information can be stored in a RAM or NV-RAM associated with the BMC. Information stored in the RAM may be lost after power-down of the power plane for BMC 190, while information stored in the NV-RAM may be saved through a power-down/power-up cycle of the power plane for the BMC.

Information handling system 100 can include additional components and additional busses, not shown for clarity. For example, information handling system 100 can include multiple processor cores, audio devices, and the like. While a particular arrangement of bus technologies and interconnections is illustrated for the purpose of example, one of skill will appreciate that the techniques disclosed herein are applicable to other system architectures. Information handling system 100 can include multiple central processing units (CPUs) and redundant bus controllers. One or more components can be integrated together. Information handling system 100 can include additional buses and bus protocols, for example, I²C and the like. Additional components of information handling system 100 can include one or more storage devices that can store machine-executable code, one or more communications ports for communicating with external devices, and various input and output (I/O) devices, such as a keyboard, a mouse, and a video display.

For purposes of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smartphone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as processor 102, a programmable logic array (PLA), an embedded device such as a System-on-a-Chip (SoC), or other control logic hardware. Information handling system 100 can also include one or more computer-readable media for storing machine-executable code, such as software or data.

When a portable information handling system such as a laptop or notebook computer, or a smartphone, is powered off or in a low power state, a user may not be able to obtain power delivery information. For example, the user typically cannot obtain the battery charge level while the portable information handling system is in the low power state and/or when its lid is closed without opening the lid and waking up the portable information handling system. As such, the user may not know that the battery is approaching total discharge until the battery has been exhausted. To address this issue and other concerns, the present disclosure provides a system and method to display power delivery data of a docked portable information handling system at a connected display device even when the portable information handling system is powered off or in a low power state with its lid closed.

FIG. 2 shows an environment 200 for providing power delivery data while an information handling system is powered off or in a low power state. Environment 200 includes an information handling system 205, a docking station 220, and displays 240, 245, and 250. Information handling system 205 includes a display manager 207 and a power delivery controller 210. Docking station 220 includes an embedded controller 225, a power delivery controller 230, and a multi-stream (MST) hub 235. Power delivery controller 210 may be coupled to power delivery controller 230 via a USB Type-C interface. Power delivery controller 230 may be coupled to embedded controller 225 via an I²C interface. Embedded controller 225 may be coupled to MST hub 235 via an I²C interface. Displays 240, 245, and 250 may be coupled to MST hub 235 via a DisplayPort® interface or an HDMI interface. Although three displays are shown coupled to MST hub 235, there may be fewer or more displays coupled to MST hub 235.

Information handling system 205 may be a portable information handling system, such as a laptop, notebook, smart phone or similar, which is designed to operate using power supplied by a rechargeable battery. Power drawn from an electrical outlet or a docking station may be used to charge the battery of information handling system 205. In this example, information handling system 205 may be currently docked at docking station 220. In this example, even when information handling system 205 is powered off, in a modern standby, or low power state, power delivery information associated with information handling system 205 may be available via an external display connected to docking station 220. For example, even when information handling system 205 is in an S1, S2, S3, S4, or S5 power state, the user may obtain the battery charge level without waking up information handling system 205. In addition, even if a lid of information handling system 205 is closed, the user may have access to the power delivery information without opening the lid, powering on, or booting information handling system 205 to an operating system.

Display manager 207 may be configured to allow the user to select which power delivery information to provide at least one of displays 240, 245, and 250. Displays 240, 245, and 250 may be external display devices, such as a display monitor, computer monitor, television, or similar. For example, displays 240, 245, and 250 may be a liquid crystal device, organic light-emitting diode, plasma, cathode ray tube, or similar. By default, a battery charge level of information handling system 205 may be selected. In addition, the user may be able to select additional power delivery information and how these may be displayed, such as by text and/or image. In another embodiment, the user may select other visual indicators, such as a light-emitting diode (LED) visual and/or audible beep notification indicator to help in assessing power delivery data associated with information handling system 205. For example, the embedded controller may cause a selected LED to blink corresponding to the amount of the battery charge level. In yet another embodiment, the embedded controller may cause a number or length of beeping corresponding to the amount of the battery charge level.

Docking station 220 may be configured to support the use of information handling system 205 while utilizing external displays, like displays 240, 245, and 250 with other I/O devices coupled to docking station 220, such as a speaker, external keyboard, mouse, camera, etc. For example, docking station 220 may provide display information on displays 240, 245, and 250 associated with information handling system 205 when information handling system 205 is coupled to docking station 220. In addition, while information handling system 205 is docked, docking station 220 may provide power to information handling system 205 for recharging its internal battery. In some scenarios, such as at a public workstation, docking station 220 may support providing power to different types of portable information handling systems concurrently.

In various embodiments, docking station 220 may provide power to information handling system 205 via a USB-C type-C docking connection. Docking station 220 may include a USB-C port, a USB-C docking port, a plurality of ports for coupling external devices to docking station 220, and a logic unit operable to detect a multimode USB-C adapter coupled to the USB-C port, wherein multimode USB-C adapter supports USB power delivery power transmissions. Accordingly, power delivery controller 230 may be configured to negotiate a power delivery contract with power delivery controller 210. As such, power delivery controller 230 may be configured to request and receive information from power delivery controller 210 and/or a battery internal to information handling system 205. Power delivery controller 230 may also be configured to monitor an output or status of the battery. Power delivery controller 230 may then transmit the received information to embedded controller 225 which includes a logic unit for processing. Based on the received information, embedded controller 225 may execute instructions in accordance with at least one policy and/or rule. The policy and/or rules may be stored in a non-volatile memory. For example, embedded controller 225 may be configured to select a pre-generated image based on the received information for display by MST hub 235 at least one of displays 240, 245, and 250. Embedded controller 225 may also generate an image if there is no pre-generated image available. Otherwise, embedded controller 225 may provide a text associated with the received information for display.

MST hub 235 may be configured to support multiple displays. In particular, MST hub 235 allows multiple independent displays to be driven from a single DisplayPort® or similar interface of information handling system 205. MST hub 235 may be configured to display power delivery data including battery status information based on a current power state of information handling system 205. Battery status information may include a battery charge level, also referred to as the battery's state of charge, health status, error code if any, in-service time, battery charging status, and/or other battery information. The in-service time includes a number of minutes or hours the battery has been charging. Other battery information includes a brand, identifier, voltage, temperature, etc.

Those of ordinary skill in the art will appreciate that the configuration, hardware, and/or software components of environment 200 depicted in FIG. 2 may vary. For example, the illustrative components of environment 200 are not intended to be exhaustive but rather are representative to highlight components that can be utilized to implement aspects of the present disclosure. For example, other devices and/or components may be used in addition to or in place of the devices/components depicted. The depicted example does not convey or imply any architectural or other limitations with respect to the presently described embodiments and/or the general disclosure. In the discussion of the figures, reference may also be made to components illustrated in other figures for continuity of the description. The components of environment 200 may be implemented in hardware, software, firmware, or any combination thereof. In addition, the components shown are not drawn to scale, and environment 200 may include additional or fewer components. In addition, connections between components may be omitted for descriptive clarity.

Figure 3:
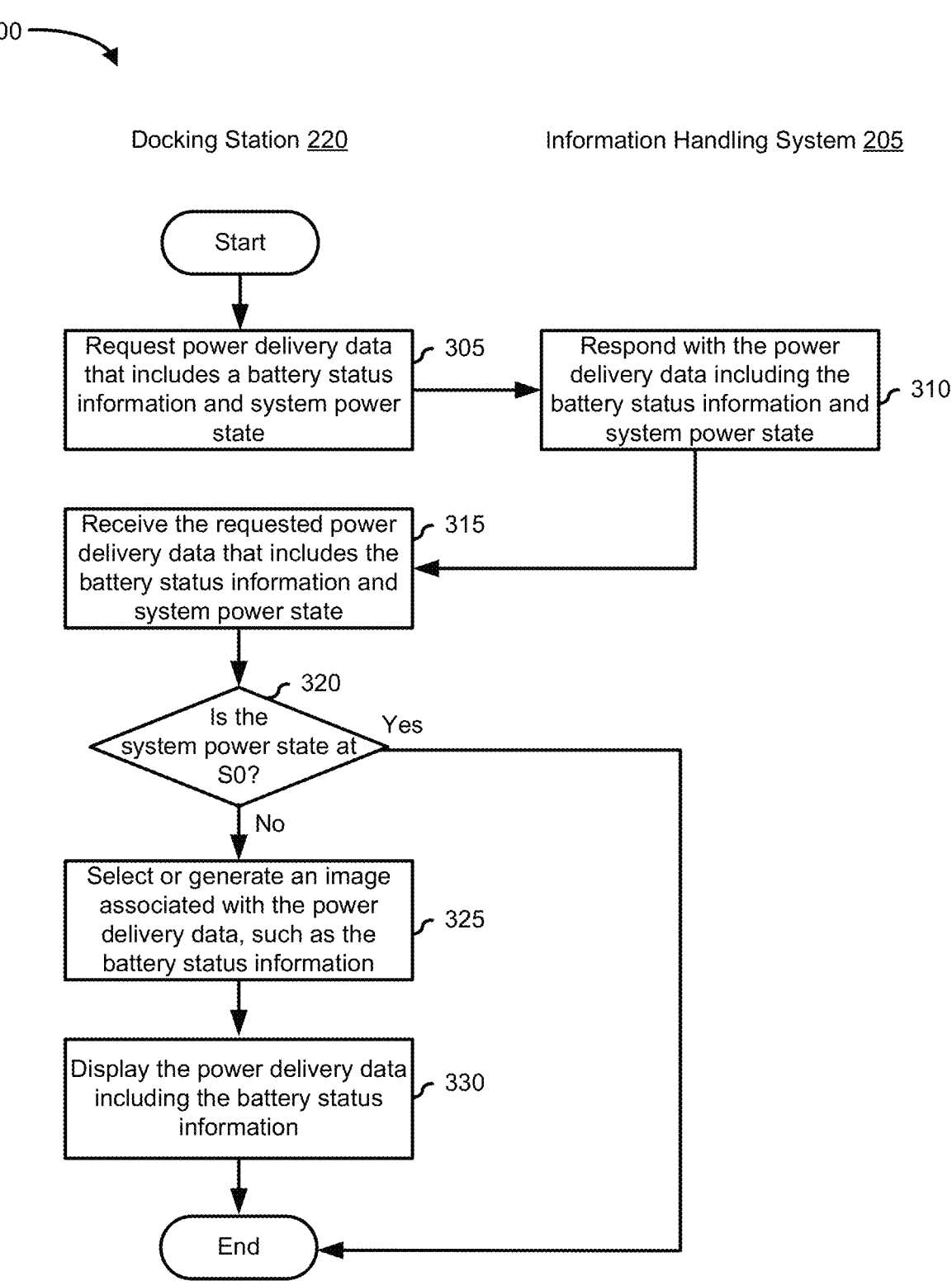
FIG. 3 is a flowchart of a method for providing power delivery data while an information handling system is powered off or in a low power state, according to an embodiment of the present disclosure.

FIG. 3 shows a flowchart of a method 300 for providing power delivery data while an information handling system is powered off or in a low power state. Method 300 may be performed by one or more components of environment 200 of FIG. 2. For example, blocks 305, 315, 325, 330, and decision block 320 may be performed by docking station 220 while block 310 may be performed by information handling system 205. While embodiments of the present disclosure are described in terms of environment 200 of FIG. 2, it should be recognized that other environments may be utilized to perform the described method.

Method 300 typically starts at block 305 where docking station 220 or in particular, power delivery controller 230 of FIG. 2, may request power delivery data from information handling system 205. The request may be performed periodically and transmitted via a low-level transport protocol so as not to wake up information handling system 205. The request for power delivery data may include a request for battery status information and system power state. For example, the power delivery controller may use a communication channel of a USB type-C interface to transmit a "Get Battery Status" and "Get Status" control message periodically. The method proceeds to block 310.

At block 310, information handling system 205, or in particular power delivery controller 210, may transmit a response to the request for the power delivery data. Accordingly, the response may include information associated with the requested power delivery data including the battery status information and system power state. For example, information handling system 205 may return a battery status data object, wherein the number of data objects field in the header may be set to one. The battery status information includes the battery charge level and battery charging status. The method proceeds to block 315.

At block 315, docking station 220 or in particular, power delivery controller 230 of FIG. 2 may receive the response from information handling system 205. Power delivery controller 230 may transmit the response to embedded controller 225 of FIG. 2 for processing. The method proceeds to decision block 320 where docking station 220 or in particular, embedded controller 225 may determine whether the information handling system 205 is at an S0 power state based on the power delivery data received, wherein S0 is a working power state, such as information handling system 205 is powered on and operational. If information handling system 205 is in the S0 power state, then the "YES" branch is taken, and the method ends. If information handling system 205 is not in the S0 power state, then the "NO" branch is taken, and the method proceeds to block 325.

At block 325, embedded controller 225 of FIG. 2 may select a pre-generated image associated with the power delivery data. For example, embedded controller 225 may select battery image 260 with the text indicating the battery charge level. The image may have been stored in a non-volatile memory, such as an NV-RAM or similar that is accessible by embedded controller 225. The image may be of various formats such as a bitmap, joint photographic experts' group, portable network graphics, graphics interchange format, etc. Embedded controller 225 may also generate the image, such as when there is no pre-generated image available. Embedded controller 225 may send the image to MST hub 235 of FIG. 2. At this point, the information handling system may be in one of the following power states: S1, S2, S3, S4, S5, or modern standby power states. The information handling system may also be in a G3 powered off state. The method proceeds to block 330.

At block 330, MST hub 235 may display the pre-generated or generated image on a primary display connected to the information handling system, such as display 245 of FIG. 2. For example, MST hub 235 may overlay the image, such as a battery image 260, on an application window at display 245. The image may be in the form of a numerical percentage, a graphical icon, or both.

In another embodiment, MST hub 235 may clone the image and display the cloned image to the other connected display devices. In yet another embodiment, MST hub 235 may wake a display, such as an integrated display of information handling system 205, or one of displays 240, 245, or 250. MST hub 235 may also prevent the display from going into a low-power state. MST hub 235 can either choose to wake the display periodically to display an image of the updated battery charge level or keep the display awake based on a user setting or preference. Afterwards, the method ends.

Although FIG. 3 show example blocks of method 300 in some implementation, method 300 may include additional blocks, fewer blocks, different blocks, or differently arranged blocks than those depicted in FIG. 3. Those skilled in the art will understand that the principles presented herein may be implemented in any suitably arranged processing system. Additionally, or alternatively, two or more of the blocks of method 300 may be performed in parallel.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionalities as described herein.

When referred to as a "device," a "module," a "unit," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCM-CIA) card, or other such expansion card), or a system (such as a motherboard, a system-on-a-chip (SoC), or a standalone device).

The present disclosure contemplates a computer-readable medium that includes instructions or receives and executes instructions responsive to a propagated signal; so that a device connected to a network can communicate voice, video, or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes, or another storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents but also equivalent structures.

What is claimed is:

1. A method comprising:

requesting, by a processor of a docking station, power delivery data from an information handling system, wherein the information handling system is docked at the docking station, wherein the information handling system includes a lid, and wherein the docking station is connected to a display device that is separate from the information handling system;

receiving a battery status data object from the information handling system in response to the requesting of the power delivery data, wherein the battery status data object includes the power delivery data that further includes a battery charge level and a system power state;

if the information handling system is not in a working power state based on the system power state included in the battery status data object and the lid of the information handling system is closed, then generating an image based on the battery charge level included in the battery status data object; and displaying the generated image on the display device.

2. The method of claim 1, wherein the request is transmitted via a low-level transport protocol.

3. The method of claim 1, wherein the information handling system is in a low power state.

4. The method of claim 1, further comprising cloning the generated image and displaying the cloned image in another display device connected to the docking station.

5. The method of claim 1, wherein the generated image is a graphical icon.

6. The method of claim 1, wherein the information handling system is in a powered off state.

7. The method of claim 1, further comprising waking the display device prior to the displaying of the image.

8. The method of claim 1, wherein the image is a bitmap.

9. A system, comprising:

an information handling system; and a docking station comprising a processor programmed with instructions that when executed cause the processor to perform operations including:

requesting by the docking station, power delivery data from the information handling system, wherein the information handling system is docked at the docking station, wherein the information handling system includes a lid, and wherein the docking station is connected to a display device that is separate from the information handling system;

receiving a battery status data object from the information handling system in response to the requesting of the power delivery data, wherein the battery status data object includes the power delivery data that further includes a battery charge level and a system power state;

if the information handling system is not in a working power state based on the system power state included in the battery status data object and the lid of the information handling system is closed, then generating an image based on the battery charge level included in the battery status data object; and displaying the generated image on the display device.

10. The system of claim 9, wherein the information handling system is in a low-power state.

11. The of claim 9, wherein the operations further include cloning the generated image and displaying the cloned image in another display device connected to the docking station.

12. The system of claim 9, wherein the generated image is a graphical icon.

13. The system of claim 9, wherein the information handling system is in a powered off state.

14. The system of claim 9, further comprising waking the display device prior to the displaying of the image.

15. A non-transitory computer-readable medium including instructions that are executable to perform operations comprising:

requesting, by a docking station, power delivery data from an information handling system, wherein the information handling system is docked at the docking station, wherein the information handling system includes a lid, and wherein the docking station is connected to a display device that is separate from the information handling system;

receiving a battery status data object from the information handling system in response to the requesting of the power delivery data, wherein the battery status data object includes the power delivery data that further includes a battery charge level and a system power state;

if the information handling system is not in a working power state based on the system power state included in the battery status data object and the lid of the information handling system is closed, then generating an image based on the battery charge level included in the battery status data object; and displaying the generated image on an external display device.

16. The non-transitory computer-readable medium of claim 15, wherein the information handling system is in a low power state.

17. The non-transitory computer-readable medium of claim 15, wherein the operations further comprise cloning the generated image and displaying the cloned image in another display device connected to the docking station.

18. The non-transitory computer-readable medium of claim 15, wherein the generated image is a graphical icon.

19. The non-transitory computer-readable medium of claim 15, wherein the information handling system is in a powered off state.

20. The non-transitory computer-readable medium of claim 15, wherein the operations further comprise waking the display device prior to the displaying of the image.

\* \* \* \* \*